CONTROLLER FOR DATA PROCESSING SYSTEM
Filed Sept. 29, 1964 4 Sheets-Sheet 1
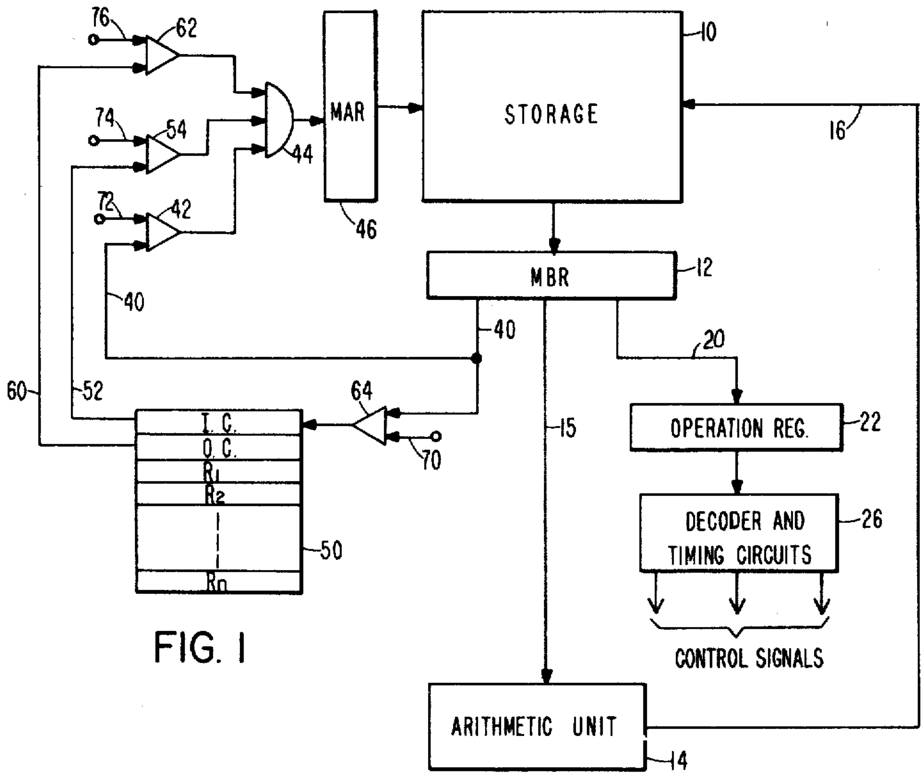
FIG. 1
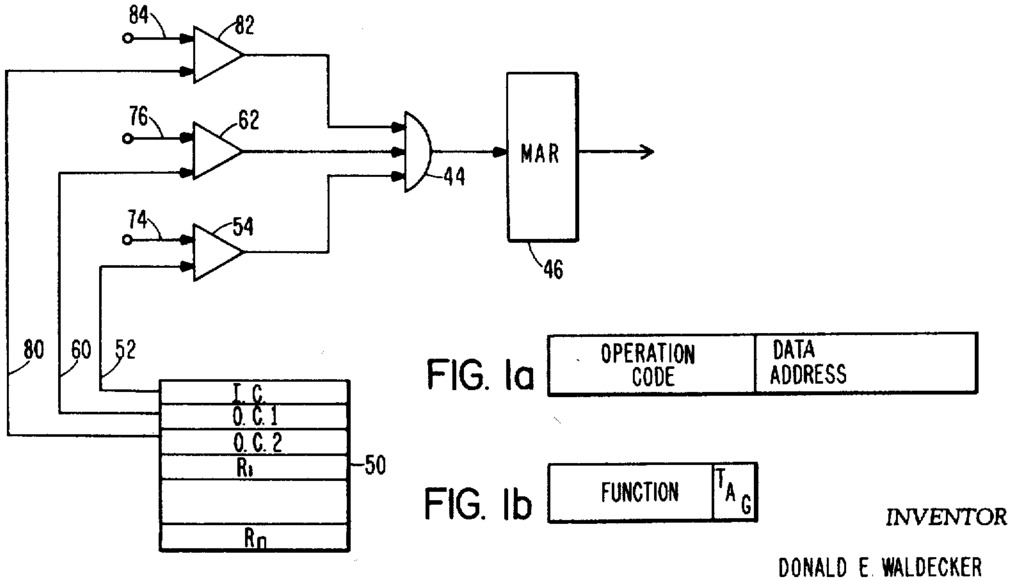
FIG. 1a FIG. 1b
FIG. 2
INVENTOR
DONALD E. WALDECKER
BY Thomas & Crickenberger
ATTORNEYS Aug. 6, 1968 D. E. WALDECKER 3,396,371

CONTROLLER FOR DATA PROCESSING SYSTEM

Filed Sept. 29, 1964 4 Sheets-Sheet 3

Aug. 6, 1968 D. E. WALDECKER 3,396,371

CONTROLLER FOR DATA PROCESSING SYSTEM

Filed Sept. 29, 1964 4 Sheets-Sheet 4

United States Patent Office 3,396,371
Patented Aug. 6, 1968

3,396,371

CONTROLLER FOR DATA PROCESSING SYSTEM

Donald E. Waldecker, Endicott, N.Y., assignor to International Business Machines Corporation, New York, N.Y., a corporation of New York Filed Sept. 29, 1964, Ser. No. 400,015
15 Claims. (Cl. 340—172.5)

ABSTRACT OF THE DISCLOSURE

A controller for data processing system having a storage for storing operands and instructions with a data path to a push down memory which has a plurality of registers wherein the topmost two registers store the instruction address and the operand address, the content of each of the two topmost registers being selectively incremented and supplied to the storage device for addressing purposes, and wherein the push down memory serves to store subroutine entry and exit points of a program of instructions.

BACKGROUND OF THE INVENTION (1) This invention relates to data processing systems and more particularly to an improved program control arrangement for such systems.

(2) It is customary in present day machines for processing data to access storage for the operation portion of each instruction which is performed. Each instruction normally includes an operation portion which defines the operation to be performed and an address portion which defines a storage location at which the associated operand is stored. A second access to storage is necessary where an instruction involves an operand. The need to access storage once for the operation portion of each instruction utilizes a lot of valuable computer time, particularly in long computer programs involving thousands of instructions.

It is customary also in present day machines for processing data to store instructions in the form of words having an operation portion and an operand address portion. The storage of operand addresses in instruction words in storage reduces the remaining portion of storage space where operands otherwise might be stored. To the extent that the total storage space allotted for the storage of instructions is increased for a given data processing machine, inefficiencies result which include among others, an increase in the required time for performing a given program of instructions.

SUMMARY OF THE INVENTION

In order to overcome the foregoing and other difficulties of present day machines, it is a feature of this invention to provide an improved program control arrangement for a data processing machine which reduces storage space normally allotted to instructions by utilizing operand counters to signify operand addresses rather than use space for this purpose in the instruction portion of storage. As a result additional storage space for operands is provided, and the efficiency of the data processing system is improved.

It is another feature of this invention to provide an improved data processing system for performing a program of instructions by reducing the number of memory accesses for instruction purposes. To the extent that the number of storage accesses for this purpose is reduced, the time for performing a given program of instructions is likewise reduced, resulting in a saving of valuable computer time.

It is another feature of this invention to provide a push-down memory in a program control arrangement of a data processing machine for the purpose of storing the exit address from instructions in a main program when branching to subroutines, and if further branches are made from subroutines to other subroutines, the processing is returned in reverse order through the various subroutines back to the main program.

It is another feature of this invention to provide a novel program control arrangement for a data processing device which includes a push-down memory wherein operand addresses may be stored, thereby reducing the number of operand addresses which must be stored in the instruction portion of storage normally allotted for this purpose.

It is a further feature of this invention to provide a simple and orderly arrangement for performing branch or jump instructions from a main program through one or more subroutines and back to the main program by using a control system which includes a push-down memory.

It is still another feature of this invention to provide an improved program control arrangement for a data processing system which utilizes a push-down memory arrangement to store instruction addresses and operand addresses and provide for the interchangeable use of instruction addresses to procure operands or operand addresses to procure instructions, as the programmer may desire.

It is another feature of this invention to provide a simple and orderly arrangement in a data processing system for performing branch or jump instructions from a main program to one or more subroutines and back to the main program by utilizing a novel program control arrangement which includes a push-down memory for storing exit address and providing them in reverse order upon demand.

It is a still further feature of this invention to provide a simple and orderly arrangement for performing branch or jump instructions from a main program through one or more subroutines and back to the main program by using a novel program control device which includes a push-down memory arrangement for storing the departure points from main programs or subroutines and modifying the departure points prior to returning through them back to one or more subroutines to the main program.

It is a feature of this invention to provide a simple and orderly arrangement for performing branch or jump instructions from a main program through one or more subroutines and back to the main program by utilizing a novel program control arrangement which includes a push-down memory which stores the exit instruction addresses and uses such instruction addresses as operand addresses, thereby modifying the exit instruction addresses to obtain different return addresses through one or more subroutines to the main program.

It is a still further feature of this invention to provide a novel program control device which provides a simple and orderly arrangement for performing branch or jump instructions from a main program through one or more subroutines and which modifies the return points through one or more subroutines in proceeding back to the main program by using a push-down memory.

It is another feature of this invention to provide a novel program control device for computing machines which permits a simple and orderly arrangement for performing branch or jump instructions from a main program through one or more subroutines and back to the main program by utilizing a push-down memory arrangement and an instruction format which includes an operation portion and a tag portion, the tag portion permitting the use of the departure or exit points of a main program or subroutine as operand addresses in subsequent processing, thereby changing the return addresses of one or more subroutines or the main program.

The foregoing and other objects, features and advantages of the invention will be apparent from the following more particular description of preferred embodiments of the invention, as illustrated in the accompanying drawings in which:

BRIEF DESCRIPTION OF THE DRAWING

FIGURE 1 illustrates one embodiment according to the present invention;

FIGURES 1*a* and 1*b* illustrate an instruction format used in connection with the circuit arrangement of FIGURE 1;

FIGURE 2 illustrates a modification of the system illustrated in FIGURE 1;

DESCRIPTION OF THE PREFERRED EMBODIMENTS

Figure 3:
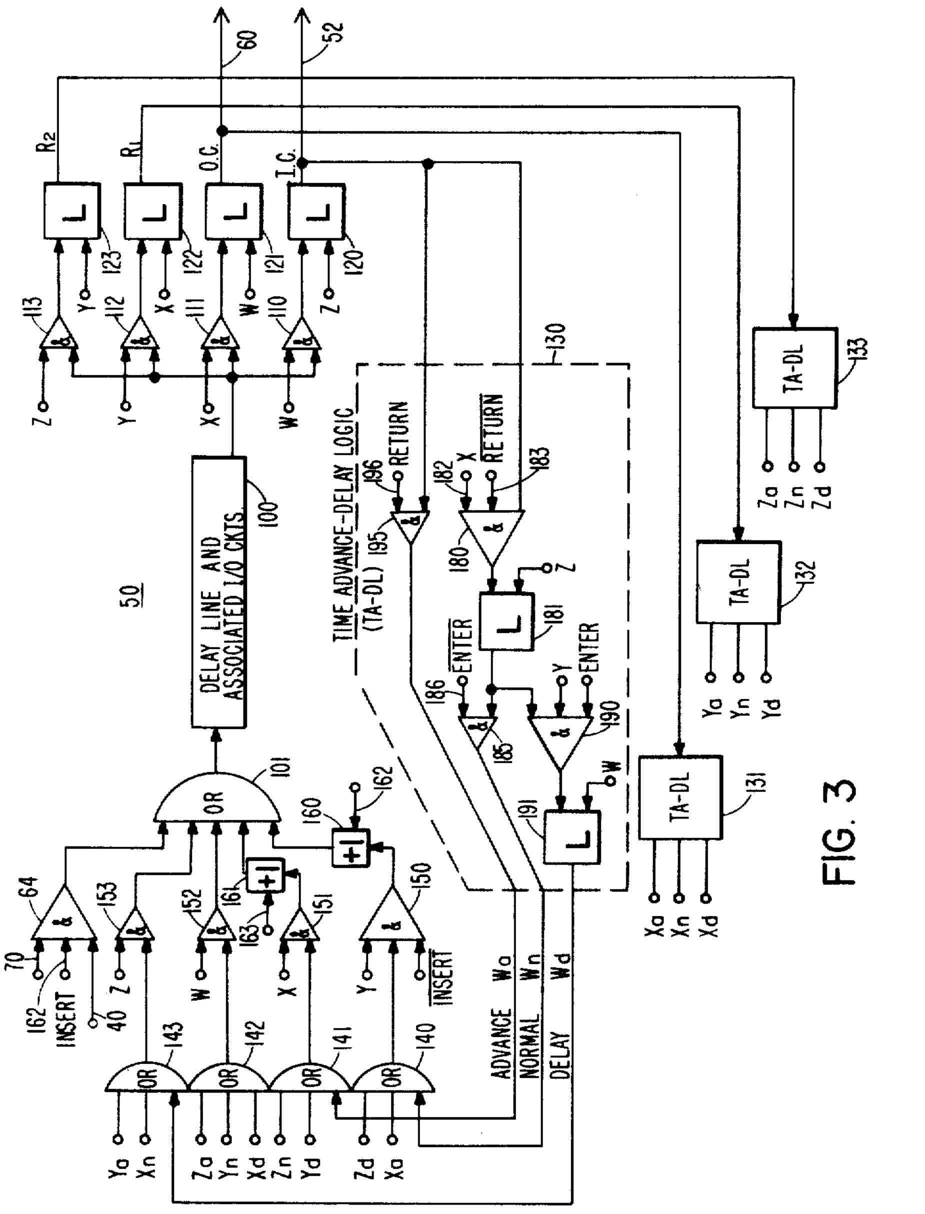
FIGURE 3 illustrates in detail a logical circuit arrangement of one suitable push-down memory device for use in connection with FIGURES 1 and 2.

Reference is made to FIGURE 1 which illustrates one novel data processing arrangement according to the present invention. Data in a storage device 10 includes instruction words and operand words. Information in storage 10 is read to a memory buffer register 12. The information taken from the storage 10 is a multi-bit word which is stored in the multi-stage memory buffer register 12. If the information in the memory buffer register 12 is an operand word, it is transferred to the arithmetic unit 14 via a channel or line 15. The channel or line 15 designates multiple conductors on which the multi-bit information is transferred. Information from the arithmetic unit 14 may be returned along a multi-conductor line 16 to the storage 10. In addition to the lines 15 and 16, lines 20, 24, 40, 52 and 60 are multi-conductor cables.

If the information disposed in the memory buffer register 12 is an instruction word, it has several portions as illustrated in FIGURES 1*a* and 1*b*. Basically, an instruction word includes an operation portion and a data address having the format indicated in FIGURE 1*a*, and the operation portion may be further defined as having a function portion and a tag portion as illustrated in FIGURE 1*b*. The operation portion specifies the particular instruction to be performed, and the data address specifies the location of the operand in memory on which the instruction is to operate. The tag portion of an operation code may be employed to specify any one of several alternatives in a particular instruction.

If a word in the memory buffer register 12 of FIGURE 1 is an instruction word, the operation portion is transferred along a line 20 to an operation register 22, and the content of the operation register 22 is supplied along a line 24 to a decoder and timing circuit 26. The decoder and timing circuit 26, hereafter referred to as the decoder for convenience, supplies control signals which are utilized throughout the computer or data processing system to cause a particular instruction to be performed.

The address of an operand on which a particular instruction is to operate is indicated by the data address portion of an instruction word in the memory buffer register 12 in FIGURE 1. The data address may be transferred along a line 40 through an AND circuit 42 and an OR circuit 44 to a memory address register 46. The storage address specified by the memory address register 46 is read from the storage 10 through the memory buffer register 12 to the arithmetic unit 14. The information passing through the memory buffer register 12 may be supplied to other load devices, not shown, of a computing device or data processing system.

A push-down memory 50 is provided in FIGURE 1 to serve various purposes. As illustrated, the first register is designated as an instruction counter (I.C.). The second register is designated as an operand counter (O.C.). The first and second registers are provided with circuits for incrementing by the value of one the content thereof. The registers R1, R2, . . . R*n* are provided in the push-down memory 50 for storage purposes only, and no incrementing may take place in these registers. Whenever information is supplied to the push-down memory 50, it is supplied through the first register which is the instruction counter. Information previously held in the instruction counter is automatically transferred down to the operand counter, the content of which is automatically transferred down to the register R1 and similar transfers are made downward through the remaining registers. Thus the descriptive name is derived. When information is taken from the push-down memory 50, it is taken from the first register which is the instruction counter, and the content of each register therebelow is transferred up one position to the register above. For example, if the content of the instruction counter is removed from the push-down memory 50, the content of the operand counter is transferred to the instruction counter, the content of R1 is transferred to the operand counter, the content of R2 is transferred to R1, etc.

The content of the instruction counter may be nondestructively read from the push-down memory 50 and transferred along the line 52 through the AND circuit 54 and the OR circuit 44 to the memory address register 46. The content of the instruction counter supplied to the memory address register 46 represents the storage location from which the next instruction is to be taken.

The content of the operand counter of the push-down memory 50 may be read nondestructively along the line 60 through an AND circuit 62 and the OR circuit 44 to the memory address register 46. The content of the operand counter supplied to the memory address register 46 indicates the storage address of the next operand to be operated on. The content of the instruction counter and the operand counter in the push-down memory 50 may be incremented by the value of 1, and they are incremented when employed as counters. The instruction counter and the operand counter may be employed as registers without incrementing in some instances. For example, if the next operand address is supplied by the memory buffer register 12 along the line 40 to the memory address register 46, the content of the operand counter in the push-down memory 50 is not incremented. Also, if a branch operation is to be performed, the address of the next instruction is supplied by the memory buffer register 12 to the memory address register, and the content of the instruction counter is not incremented. Instead, the content of the instruction counter is pushed down and the address of the next instruction is supplied not only to the memory address register 46, but it is supplied also to the instruction counter of the push-down memory 50. This permits the branching operation to a subroutine to take place, and subsequent addresses are taken from the instruction counter which is incremented each time the content is used to secure an instruction. When a branch operation takes place, the next instruction address held in the memory buffer register 12 is transferred along the line 40 through the AND circuit 64 to the instruction counter of the push-down memory 50. The content of the instruction counter then signifies the starting address of a subroutine. Successive instruction addresses are supplied by the instruction counter which is incremented each time the content is used to address the storage 10. Control lines 70, 72, 74 and 76 of respective AND circuits 64, 42, 54, and 62 are energized by signals from the decoder 26 when these AND circuits are selected for use.

The computer operation is divided into two main cycles which are designated the instruction cycle and the operation cycle. At the start of the instruction cycle the content of the instruction counter is transferred along the line 52 through the AND circuit 54 and the OR circuit 44 to the memory address register 46. A control signal is applied to the line 74 of the AND circuit 54 by the decoder 26, thereby permitting the transfer of the content of the instruction counter to the memory address register 46. The instructions stored at the address specified by the memory address register 46 is transferred from the storage 10 to the memory buffer register 12. The memory buffer register 12 holds an instruction which includes an operation portion which is transferred to the operation register 22 along the line 20 and an address portion which is transferred along the line 40, through the AND circuit 42 and the OR circuit 44 to the memory address register 46. During this time the AND gate 42 is conditioned by a control signal applied to the line 72 from the decoder 26. At this point the operation register 22 supplies signals to the decoder 26 which in turn generates control signals to perform a given instruction, and the memory address register contains signals representing the address of an operand in the storage 10 on which the instruction is to be performed.

Next the operation cycle takes place. For this purpose the storage 10 supplies an operand to the memory buffer register 12 which in turn supplies the operand to the arithmetic unit 14, and the specified operation is performed with the operand. As soon as the operation cycle has been completed, control signals from the decoder 26 increment by the value of 1 the content of the instruction counter and gate its contents to the memory address register 46 to initiate the next instruction cycle. The instruction counter is incremented by the value of 1 each time an instruction is read from memory, and in this fashion instructions are read from successive memory addresses and executed.

It is customary as part of a main program of instructions to perform branch or jump operations which involves interrupting the normal sequence of instructions to perform a subroutine of instructions. For this purpose a branch or jump instruction is used, and such a branch or jump instruction may be performed unconditionally or upon the occurrence of a condition. The branch or jump instruction specifies the address of the first instruction in the subroutine which address is remote from the next address of the normal sequence of instructions of the main program. Thus a branch or jump instruction is used to digress from the main program or normal sequence of instructions to a subroutine, and when the subroutine has been completed, another branch or jump instruction is employed to return to that point in the main program of instructions from which the departure was made. In order to return to the point in the main program from which the departure was made, it is necessary to store the address of the next instruction in the main program from which a departure is made by a branch or jump instruction. For example, if a branch instruction is located at address 100, then the address 100 may be designated as the exit address from the main program. The branch is made to an instruction located at an address specified in the branch instruction, and a subroutine of instructions is performed. When the subroutine of instructions has been completed, another branch instruction is performed by the subroutine of instructions in order to return to the main program. When the branch is made back to the main program, it is made to the instruction located at address 101, and this address is designated as the returned address. Note that the return address in this case is the exit address plus one.

It is possible that in the process of performing one subroutine, another jump or branch may be made to a still further subroutine. It is possible for branch or jump instructions within subroutines to continue numerous times. This may lead to some confusion as to how to proceed back from the various subroutines to the point in the main program from which the initial branch or jump was made. It is one feature of this invention to provide a simple and orderly arrangement for performing branch or jump instructions from a main program through one or more subroutines and back to the main program by using a push-down memory. Reference is made to Chart I which illustrates a program of instructions which might be performed by the novel apparatus of FIGURE 1. This program is merely illustrative of branching operations and it should be pointed out that the particular instructions are arbitrarily selected and various other instructions might be equally well employed.

CHART I

| Main Program of Instructions: Storage Location | Content | Subroutine of Instructions: Storage Location | Content |
|---|---|---|---|
| 80 | Add -- | | |
| 81 | Div -- | 200 | CLA -- |
| 82 | Store -- | 201 | Sub -- |
| 83 | Enter 200 | 202 | Mult -- |
| 84 | Div | 203 | Return |
| 85 | Add -- | | |

Chart I above shows a portion of a main program of instructions stored in locations 80 through 85, and each instruction includes an operation code and a data address of the format indicated in FIGURE 1*a*. In the interest of simplicity the data address has been omitted. It is assumed that the main program of instructions has previously been advanced to the instruction held in storage location 80. The value of 80 is held in the instruction counter of the push-down memory 50 in FIGURE 1. This instruction is read from memory and the operation portion is transferred to the operation register 22 and then decoded by the decoder 26 as an Add instruction. The address portion of the instruction is returned from the memory buffer register 12 to the memory address register 46, and the content of this register is supplied to the arithmetic unit 14 for the Add operation. The instruction counter in the push-down memory 50 is advanced by the count of 1 to the value 81 for the next instruction which is a Divide instruction. After the Divide operation is performed, the instruction counter of the push-down memory 50 is advanced to the count of 82, and the next instruction is read from storage 10 and decoded as a Store instruction. Accordingly, the result in the arthimetic unit 14 is stored. The content of the instruction counter is incremented by the value of 1 to 83, and the next instruction is read and decoded as an Enter instruction. This instruction is provided to cause a branch to the subroutine shown in the right column of Chart I. The address portion of this Enter instruction contains the value 200, and this value is transferred along the line 40, through the AND circuit 64 to the instruction counter of the push-down memory 50. Simultaneously as this transfer is made the previous content of the instruction counter is pushed down into the operand counter. At this point the value 200 is stored in the instruction counter and the value 83 is stored in the operand counter of the push-down memory 50. The next instruction is obtained by transferring the content of the instruction counter along the line 52, through the AND circuit 54 and the OR circuit 44 to the memory address register 56. This instruction is read from storage and decoded as a Clear and Add operation which is then performed. The content of the instruction counter is incremented to the value 201, and the next instruction is read and decoded as a Subtract instruction. Upon performance of the Subtract operation, the content of the instruction counter is incremented to the value 202, and the instruction read is decoded as a Multiply instruction which is executed in its turn. The instruction counter is incremented to the value of 203, and the next instruction read is decoded as a Return instruction. The Return instruction causes the push-down memory to push-up. That is, the instruction counter is cleared and the content lost, and the content of the operand counter is transferred up to the instruction counter. Accordingly, the value 83 is returned to the instruction counter, and this value is incremented by the quantity of one, yielding the value 84. Accordingly, the next instruction is taken from location 84 and decoded as a Divide instruction. The content of the instruction counter is incremented to the value 85, and the next instruction is decoded as an Add instruction. The main program continues on with further instructions not illustrated in Chart I.

It is pointed out that in performing a branch or jump operation by the novel arrangement of this invention it is not necessary for the Return instruction to specify a return address. This is readily observed by noting that the Return instruction at storage locations 203 of the subroutine does not specify an address portion. Accordingly, this minimizes the burden of having to keep track of and specify the return address as is customarily done in existing computing machines. This simplifies the programer's task considerably, particularly where many subroutines interrupt one another. The addresses where the interruptions occur are stored in the push-down memory 50 in FIGURE 1 in the order in which the interruptions occur, and these addresses are returned in reverse order to the instruction counter of the push-down memory merely by inserting return instructions at the end of the various subroutines.

It is a feature of this invention to be able to use the operand counter of the push-down memory 50 in FIGURE 1 to secure operands from storage 10 rather than use the address portion of an instruction for this purpose. In connection with this purpose of the invention it is a further feature to be able to change the entry point of a program of instructions as processing continues. That is, instead of returning to a fixed entry point when a branch operation is performed, the entry point may be changed as processing continues. Both of these features may be accomplished by performing a branch operation to a subroutine, using the operand counter to secure operand for use with the subroutine, and using the changed value of the operand counter as the modified entry address when returning to the main program. In order to illustrate these features of the present invention, reference is made to Chart II below.

CHART II

| Instruction Counter Content | Content of Storage Location | Operand Counter Content |
|---|---|---|
| 100 | ADD (loc A) | |
| 101 | STO (loc B) | |
| 102 | ENTER (200) | |
| 200 | CLA (T) | 103 X1 |
| 201 | SUB (lock) | |
| 202 | MULT (T) | 104 X2 |
| 203 | RETURN | 105 |
| 105 | ADD (loc C) | |
| . | | |
| . | | |
| . | | |
| . | | |
| 170 | ENTER 200 | |
| 200 | CLA (T) | 171 Y1 |
| 201 | SUB (loc K) | |
| 202 | MULT (T) | 172 Y2 |
| 203 | RETURN | 173 |
| 173 | STO (loc C) | |

The main program illustrated in Chart II has progressed to instruction 100. The instructions located at storage addresses 100 through 105 represent a portion of the main program in storage 10 of FIGURE 1. The instructions with addresses 200 through 203 represent a subroutine of instructions in storage 10 of FIGURE 1. Storage location 100 in the main program contains an Add instruction, and the associated operand is stored in location A. The instruction at storage location 101 is a Store instruction which specifies that the result in the arithmetic unit 14 in FIGURE 1 is to be stored in location B. Storage location 102 contains an Enter instruction followed by the storage location of the first instruction of the subroutine which is storage location 200. The subroutine of instructions is stored at addresses 200 through 203. When the Enter instruction is decoded, the value 103 in the instruction counter is transferred to the operand counter of the push-down memory 50, and the value 200 of the Enter instruction is transferred from the memory buffer register 12 along the line 40 through the AND circuit 64 to the instruction counter of the push-down memory 50. The next instruction read from storage 10 in FIGURE 1 is the instruction at location 200 which is a Clear and Add instruction with a tag (T) which signifies that the operand address is specified by the operand counter. Accordingly, the content of the operand counter in the push-down memory 50 in FIGURE 1 is transferred along the line 60 through the AND circuit 62 and the OR circuit 44 to the memory address register 46. The operand thus obtained is transferred to the arithmetic unit 14. After the content of the operand counter is transferred from the push-down memory 50, it is incremented by the value of 1 to the new quantity of 104. The operand stored at location 103 of the storage 10 in FIGURE 1 is arbitrarily designated X1. The next instruction is obtained by using the content of the instruction counter which is 201. The instruction at this location is a Subtract instruction and the operand is to be taken from storage location K. The next instruction is taken from location 202 which is a Multiply instruction with a tag (T) specifying that the operand is stored at the address indicated by the operand counter, and the address portion of the instruction is disregarded. Accordingly, the value 104 in the operand counter is transferred to the memory address register 46 to obtain the next operand. This operand is transferred from the storage 10 to the arithmetic unit 14, and it is arbitrarily designated X2 in Chart II. The next instruction specified by the instruction counter is located at address 203, and it is a Return instruction. Accordingly, the push-down memory 50 is pushed up, thereby destroying the content of the instruction counter and transferring the value 105 from the operand counter to the instruction counter. The main program is resumed with the instruction located at address 105 of the storage 10 in FIGURE 1 which instruction is an Add instruction with the operand disposed in location C of the storage 10. It is seen from the foregoing discussion that the operand counter is used to address data for use with a subroutine, and the normal entry point back to the main program is modified in the process.

At a later point in the program illustrated in Chart II, storage location 170 is addressed by the instruction counter. The content of the instruction counter is incremented to 171. Storage location 170 contains an Enter instruction with the associated address 200. The storage location 200 is again the starting point of the subroutine. The occurrence of the Enter command causes the quantity 200 to be placed in the instruction counter and the quantity 171 to be pushed down into the operand counter of the push-down memory 50 of FIGURE 1. The first operation in the subroutine is a Clear and Add instruction with a tag (T) signifying that the associated data should be addressed by the operand counter of the push-down memory 50 in FIGURE 1. The operand counter contains the value 171, and consequently the data Y1 at this address is used for the Clear and Add operation. The instruction at location 201 is a Subtract instruction with the associated operand stored at location K. The instruction at storage location 202 is a Multiply instruction, and the tag signifies that the operand involved should be obtained from the address specified by the operand counter of the push-down memory 50 in FIGURE 1. The operand at this address is arbitrarily designated Y2. The instruction at location 203 is a Return instruction which causes the operand counter content to be pushed up into the instruction counter and the main program to be resumed commencing with the instruction at location 173. This is a Store instruction with the store to take place at location C in storage. It is pointed out that when the first subroutine in Chart II was executed, the data X1 and X2 were addressed by the instructions stored at respective locations 200 and 202. The second time the subroutine was executed, the data Y1 and Y2 were addressed by the instruction contained in respective locations 200 and 202. This variation is made possible by the use of the operand counter which had different values for each of the two subroutines described in Chart II. In addition to providing this variable data addressing capability, the operand counter in the push-down memory 50 of FIGURE 1 contains a modified entry point for returning to the main program when the subroutines have been completed. Moreover, the entry point in the main program is automatically derived as a result of the processing which took place by the subroutines.

Reference is made next to Chart III for an illustration of how one subroutine may interrupt another and how the processing proceeds back to the main program utilizing the novel apparatus in FIGURE 1.

CHART III

| Storage Location I.C. | Content | O.C. | R1 |
|---|---|---|---|
| 300 | ADD (loc A) | | |
| 301 | DIV (loc B) | | |
| 302 | ENTER 500 | | |
| 500 | ADD (T) | 303-D1 | |
| 501 | STO (loc XX) | 304 | |
| 502 | ENTER 700 | 304 | |
| 700 | CLA (loc YY) | 503 | 304 |
| 701 | MULT (T) | 503 H1 | 304 |
| 702 | SUB (loc ZZ) | 504 | 304 |
| 703 | RETURN | 504 | 304 |
| 504 | ADD (loc AA) | 304 | |
| 505 | RETURN | 304 | |
| 304 | STO (loc CC) | | |

In Chart III the main stream of instructions is shown as having proceeded to address 300 in memory. Address 300 contains an Add instruction with the operand stored at location A in storage 10 of FIGURE 1. The instruction counter in the push-down memory 50 of FIGURE 1 is incremented to the value 301, and the instruction at this location in storage 10 is a Divide instruction with the associated operand stored in location B. The instruction counter is incremented, and the next instruction obtained is an Enter which specifies that a branch operation is to take place to a subroutine the first instruction of which is stored in address 500. The value 302 in the instruction counter is incremented to the value 303 which quantity is transferred down to the operand counter before the value 500 of the Enter instruction is transferred to the instruction counter the next instruction is taken from address 500, and it is and Add instruction with a tag (T) specifying that the operand address is that indicated by the operand counter which is address 303. The operand at this address is arbitrarily designated as D1 in Chart III. The operand counter is incremented to the value 304, and the instruction counter is incremented to the value of 501. As soon as the Add instruction has been completed, the instruction at address 501 is read and decoded as a Store instruction which specifies that the result in the arithmetic unit 14 should be stored at location XX in storage 10 of FIGURE 1. After the instruction counter has been incremented to the value 502, this instruction is read and decoded as an Enter instruction which specifies that a branch is to be made to a subroutine the first instruction of which is stored at location 700. By the time this instruction is decoded, the content of the instruction counter has been incremented to the value 503. A push-down operation takes place in the push-down memory 50 as a result of the Enter instruction. Accordingly, the value 304 in the operand counter is transferred down to the register R1; the value 503 in the instruction counter is transfered down to the operand counter; and the value 700, constituting the address portion of the Enter instruction, is transferred from the memory buffer 12 along the line 40 and through the AND circuit 64 to the instruction counter of the push-down memory 50 in FIGURE 1. The next instruction is taken from storage address 700 and decoded as a Clear and Add instruction with the associated operand at location YY. After the instruction counter is incremented to the value 701, the next instruction is read and decoded as a Multiply instruction with a tag (T) specifying that the associated operand address is indicated by the operand counter. The content of this counter is 503, and the operand disposed in the address 503 is arbitrarily designated as H1 in Chart III. After the instruction counter is incremented to the value 702, the next instruction is read and decoded as a Subtract instruction with the associated operand at location ZZ. Again the instruction counter is incremented to the value 703, and the next instruction is read and decoded as a Return instruction which causes the push-down memory 50 to perform a push-up operation. Accordingly, the incremented value 704 in the instruction counter is destroyed; the incremented value 504 in the operand counter is transferred to the instruction counter; and the value 304 in the register R1 is transferred to the operand counter. At this point the subroutine of instructions stored in addresses 700 through 703 has been completed, and the program is returned to the subroutine with instructions at positions 500 through 505, a portion of which has been completed previously.

The next instruction is read from address 504 and decoded as an Add instruction with the operand disposed in location AA. After the instruction counter is incremented to the value 505, the next instruction is read and decoded as a Return instruction which causes the push-down memory 50 to perform another push-up operation. Accordingly, the incremented value 506 in the instruction counter is destroyed, and the value 304 in the operand counter is transferred to the instruction counter. The next instruction is located at address 304, and it is read and decoded as a Store instruction specifying that the result in the arithmetic unit 14 is to be stored at location CC in storage. The main program is resumed commencing with the instruction stored at address 304, and the main stream of instruction continues from there. Accordingly, it is seen how one subroutine of instructions may interrupt another subroutine of instructions and how both subroutines are completed before returning to the main program. It is further pointed out that the entry point in the main program was changed by one of the subroutines. That is, the main program was interrupted by the instruction at address 302, and processing was resumed in the main program commencing with the instructions stored at address 304.

Reference is made next to FIGURE 2 for an illustration of a modification of the circuit arrangement illustrated in FIGURE 1. It is sometimes desirable to secure operands from several alternative locations in storage. For this purpose the circuitry in FIGURE 1 may be modified as illustrated in FIGURE 2. Like components in FIGURE 2 are labeled with the same reference numerals used in FIGURE 1. Note that in FIGURE 2 an additional operand counter labeled O.C. 2 is provided, and the content of the operand counter 2 may be conveyed along a line 80 through an AND circuit 82 and OR circuit 44 to the memory address registers 46. The AND circuit 82 is provided with a control signal on the line 84 when it is selected to pass the content of the operand counter 2 to the memory address register 46. The remaining elements in FIGURE 2 are identical to those illustrated in FIGURE 1. The tag portion of the operation code of an instruction, such as illustrated in FIGURE 1*b*, is used to specify whether the operand counter 1 or the operand counter 2 is to be utilized. This provides the programmer with certain flexibility in securing operands from storage 10 in FIGURE 1. One example of this additional flexibility is illustrated in Chart IV.

CHART IV

| Storage Location I.C. | Content | O.C. 1 | O.C. 2 |
|---|---|---|---|
| 800 | ENTER 850 | | |
| 850 | ENTER 900 | 801 | |
| 900 | CLA (Toc 1) | 851 K1 | 801 |
| 901 | SUB (Toc 2) | 852 | 801 L1 |
| 902 | DIV (Toc 2) | 852 | 802 N1 |
| 903 | ADD (Toc 1) | 852 P1 | 803 |
| 904 | RETURN | 853 | 803 |
| 853 | MULT (Toc 1) | 803 T1 | |
| 854 | STO (loc G) | 804 | |
| 855 | RETURN | 804 | |
| 804 | CLA (loc M) | | |

Note that in Chart IV the instruction stored at address 800 is an Enter instruction which causes the main program to branch to a subroutine the first instruction of which is stored at address 850. The value 800 in the instruction counter is incremented to the value 801, and the latter value is stored in operand counter 1, and the value 850 is transferred from the memory buffer 12 to the instruction counter in FIGURE 1. The instruction at storage location 850 is read and decoded as an Enter instruction with specifies that a new subroutine is to be executed, and the first instruction of the new subroutine is located at address 900. Accordingly, after the content of the instruction counter is incremented from 850 to 851, it is transferred to the operand counter 1, and the value 801 in the operand counter 1 is transferred to the operand counter 2.

The program continues with the subroutine which is stored commencing at address 900. The instruction at address 900 is read and decoded as a Clear and Add instruction, and the tag specifies that operand counter 1 is to be used to secure the associated operand. Accordingly, the value 851 is transferred from the operand counter 1 to the memory address register, and the operand read from this location is arbitrarily designated K1 in Chart IV. The content of the operand counter 1 is incremented from the value 851 to the value 852. Also, the content of the instruction counter is incremented from the value 900 to the value 901. The next instruction, taken from storage location 901, is read and decoded as a Subtract instruction, and the tag portion specifies that the operand for this instruction is to be taken from the storage location indicated by operand counter 2. Since operand counter 2 has the value 801 disposed therein, the operand is read from this location, and is arbitrarily designated as L1 in Chart IV. The operand counter is incremented from the value 801 to the value 802. The content of the instruction counter is incremented to the value 902 from the value 901, and the instruction taken from this storage location is a Divide instruction with a tag specifying that the associated operand should be taken from the address indicated by operand counter 2. Accordingly, the operand is taken from storage location 802, designated arbitrarily as N1 in Chart IV, and the content of the operand counter 2 is incremented from the value 802 to the value 803. The content of the instruction counter is incremented to the value 903, and the instruction taken from this address is an Add instruction which specifies that the associated operand should be taken from the address indicated by operand counter 1. Accordingly, the next operand is taken from storage address 852, and the operand is arbitrarily designated P1 in Chart IV. The content of the operand counter 1 is incremented from the value 852 to value 853. The instruction counter is incremented to the value 904, and the instruction at this address is read and decoded as a Return instruction. Accordingly, the push-down memory 50 in FIGURES 1 and 2 is pushed up. That is, the content of the instruction counter is destroyed; the value 853 in the operand counter 1 is transferred to the instruction counter; and the value 803 in the operand counter 2 is transferred to the operand counter 1. At this point the subroutine with instructions at locations 900 through 904 has been completed, and the program has returned to the subroutine with instructions stored at locations 850 through 855.

The next instruction is taken from address 853 in storage, and it is decoded as a Multiply instruction. The tag portion of this instruction specifies that the associated operand is to be taken from the address indicated by operand counter 1. Therefore, the operand is taken from address 803, and this operand is arbitrarily designated as T1 in Chart IV. The content of the operand counter 1 is incremented from the value 803 to the value 804. The instruction counter is incremented to the value 854, and the next instruction is read and decoded as a Store instruction which specifies that the result in the arithmetic unit 14 in FIGURE 1 is to be stored at storage location G. The instruction counter is incremented to the value 855, and this instruction is read and decoded as a Return instruction. Consequently, the content of the instruction counter is destroyed, and the content 804 in the operand counter 1 is transferred to the instruction counter. The next instruction is taken from address 804 in storage, and this instruction is decoded as a Clear and Add instruction with the operand being taken from storage location M as specified by the address portion of the instruction in the memory buffer register 12 in FIGURE 1. The program continues on from this point. Accordingly, it is seen from the illustration in Chart IV that two operand counters may be employed in a flexible arrangement for addressing operands in widely different locations of memory.

The push-down memory 50 in FIGURE 1 may be either a parallel or a serial type of storage device as may the data processing system generally. Reference is made to FIGURE 3 for a detailed illustration of one suitable type of serial push-down memory device. The serial push-down memory device 50 in FIGURE 3 includes a delay line 100 which has a period of delay defined by the equation $D=(Xn-2)t$, where D=the period of time delay
X=the number of registers
$n$=the number of bits per register, and
$t$=the clock pulse width.

New data is entered or stored in the delay line 100 under control of an Enter instruction, and information is extracted from the delay line 100 by a Return instruction. During the execution of an Enter instruction data is supplied through the AND circuit 64 in FIGURES 1 and 3 and through the OR circuit 101 in FIGURE 3 to the delay line 100. Data emanates from the delay line 100 a fixed period of time later, and the data is recirculated through the delay line 100 until it is needed. Data is extracted from the delay line 100 by a Return instruction. The push-down memory 50 in FIGURE 3 is illustrated with four storage registers designated instruction counter (I.C.), operand counter (O.C.), register R1 and register R2. Data of the instruction counter, operand counter and registers R1 and R2 emanates from the delay line 100 under control of respective pulses W, X, Y and Z. These four registers are interleaved within the delay line on a bit-by-bit basis under control of the W, X, Y and Z pulses which are generated within each bit time. The illustrated logic circuits connect the output of the delay line to its input, thereby providing storage by recirculating the data. In the particular configuration in FIGURE 3 four logical circuits called time advance-delay logic (TA–DL) circuits are provided, and each is associated with a particular register, and a particular time sequence pulse, within the delay line.

Under conventional operation the time advance delay line circuit provides a one bit delay external to the delay line, and the data is circulated in the system with no change in its relative time sequence. If a time advance-delay logic circuit receives an Enter command, it provides a two bit delay and shifts the data back one sequence time in the relative time sequence. If the time advance-delay logic circuit receives a Return command it provides no delay and effectively advances the data one sequence time in the relative time sequence.

The instruction counter operates in the W time sequence. Suppose a need arises to enter a subroutine. The Enter instruction pushes the content of the instruction counter or W-sequence register down into the operand counter or X-sequence register where this information circulates undisturbed while the content of the instruction counter or the W-sequence register performs the subroutine. At the completion of the subroutine, a Return instruction pushes the content of the operand counter in the X-sequence register back into the instruction counter in the W-sequence register, and the main routine is continued.

Information from the delay line 100 passes through associated AND circuits 110 through 113 to associated latches 120 through 123. These latches are connected to respective time advance-delay logic circuits 130 through 133 each of which has 3 output lines connected to various inputs of the OR circuits 140 through 143. The OR circuits 140 through 143 are connected through respective AND circuits 150 through 153 to the OR circuit 101 which in turn is connected to the delay line 100. Add-One circuit 160 is connected between the AND circuit 150 and the OR circuit 101. The Add-One circuit 161 is connected between the AND circuit 151 and the OR circuit 101. The Add-One circuits 160 and 161 are employed to increment the instruction counter content and the operand counter content. The control lines 162 and 163 of associated Add-One circuits 160 and 161 are energized whenever an Add-One operation is to be performed.

In order to illustrate how information might be entered, stored and extracted, a further discussion of the operation of the push-down memory in FIGURE 3 is appropriate. First, let it be assumed that an Enter instruction is to be performed. The data supplied on the line 40 in FIGURE 3 passes through the AND circuit 64 at Y time and is stored in the delay line 100. A control signal labeled Insert is applied to the control line 162 of this AND circuit during an Enter instruction. This information is stored in a register representing the instruction counter, and it emanates from the delay line 100 under control of a W pulse and is passed through the AND circuit 110 to the latch 120. As soon as the Enter instruction is completed, the control levels on the lines labeled Enter are changed to signify that this instruction has been completed. Let it be assumed that the content of the instruction counter is to be recirculated without modification. Information from the latch 120 is supplied through an AND circuit 180 to a latch 181. This transfer takes place at X time. Note that the control lines 182 and 183 to the AND circuit 180 are energized by the respective X and Return signals. The information from the latch 181 is transferred through the AND circuit 185, the OR circuit 140, the AND circuit 150 which passes this information at Y time, the Add-One circuit 160 and the OR circuit 101 to the delay line 100 for reentry. The AND circuit 185 is energized by the information from the latch 181 and the level on the control line 186 which is labeled Enter. The Enter level is present and conditions the AND circuit 185 to pass information from the latch 181 to the OR circuit 140 under the assumed condition that information is to be recirculated in the delay line 100. It is pointed out that whenever the content of the instruction counter is employed to secure an instruction, it is incremented by energizing the control terminal 162 of the Add-One circuit 160.

The execution of an Enter instruction causes a push-down operation to take place. That is, the content of the instruction counter is transferred to the operand counter, and new information is inserted in the instruction counter. The content of the instruction counter from the delay line 100 passes through the AND circuit 110 at W time, and it is stored in the latch 120. The information from the latch 120 is supplied through the AND circuit 180 to the latch 181 at X time, and the output from this latch is supplied through an AND circuit 190 at Y time to a latch 191. The Return and Enter levels are operative at this time. The output of the latch 191 is applied through the OR circuit 143 to the AND circuit 153. This information is passed by the AND circuit 153 at Z time through the OR circuit 101 to the delay line 100. The new information was inserted through the AND circuit 64 and the OR circuit 101 to the delay line 100 at Y time. Thus it is noted that the new information is entered ahead of the old information stored in the instruction counter. Note that the old information stored in the instruction counter was delayed an additional period of time in this instance by the latch 191.

Let it be assumed at this point that a Return instruction is to be executed. Accordingly, a push-up operation takes place. The information in the operand counter is to be pushed up into the instruction counter. Information in the operand counter emanates from the delay line 100 and passes through the AND circuit 111 at X time to the latch 121. The information in this latch is transmitted to the time advance-delay logic circuit 131 which is identical in construction to the time advance-delay logic circuit 130. Note that in the time advance-delay logic circuit 130 the AND circuit 195 is conditioned by a level on the line 196 labeled Return. A similar AND circuit disposed in the time advance-delay logic circuit 131 passes information from the latch 121 to the OR circuit 140, and this information is passed by the AND circuit 150 at Y time through the Add-One circuit 160 and the OR circuit 101 to the delay line 100. It is pointed out that the information stored in the latch 121 at X time is reinserted in the delay line 100 at Y time, thereby advancing the content of the operand counter one register position in time. Thus a push-up operation is illustrated. Accordingly, it is seen that the serial type push-down memory in FIGURE 3, illustrated with the use of four registers, might be employed in FIGURE 1. The push-down memory 50 in FIGURE 3 may be used also for the push-down memory 50 in FIGURE 2 with certain modifications.

Figure 4:
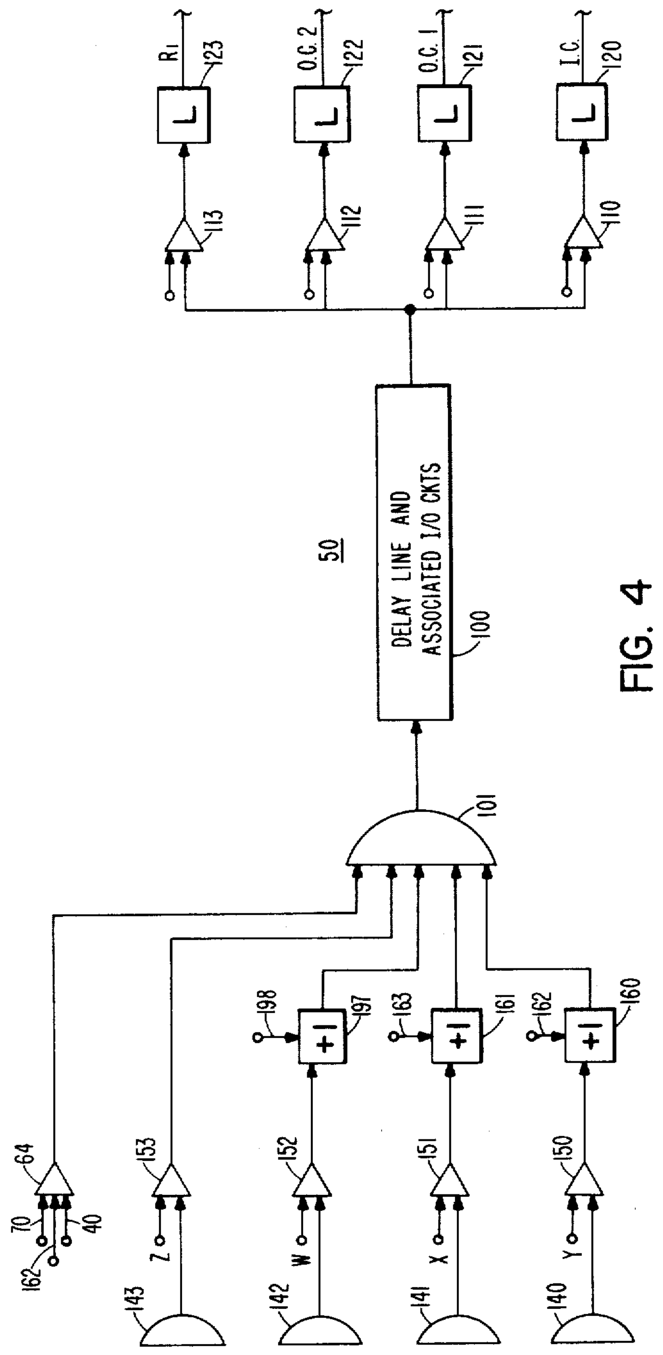
FIGURE 4 illustrates a modification of the push-down memory arrangement shown in FIGURE 3.

Referring next to FIGURE 4, the push-down memory illustrated therein is the same as that illustrated in FIGURE 3 with the exception that the time advance-delay logic circuits 130 through 133 in FIGURE 3 have been omitted in the interest of simplicity. Also, an additional Add-One circuit 197 is disposed between the AND circuit 152 and the OR circuit 101. This Add-One circuit has a control line 198 which is energized when it is desired to increment the content of the operand counter 2 (O.C. 2). It is pointed out that the outputs of the latches 120 through 123 in FIGURE 4 are designated respectively as instruction counter, operand counter 1, operand counter 2 and register R1. The operation of the push-down memory 50 in FIGURE 4 is identical to that of the push-down member 50 in FIGURE 3 with the exception that the content of the operand counter 2 in FIGURE 4 may be incremented by the Add-One circuit 197.

Figure 5:
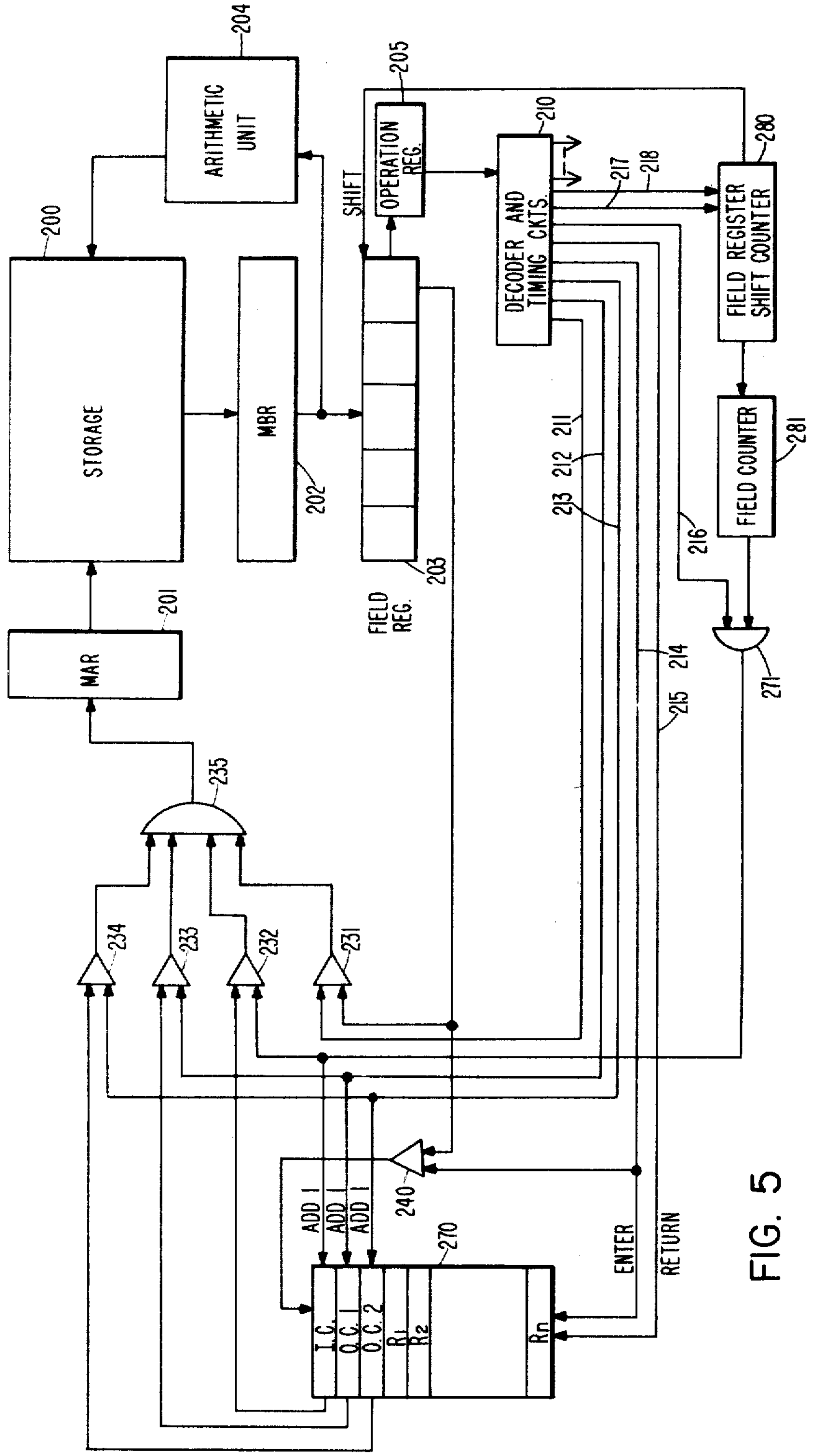
FIGURE 5 illustrates a second embodiment according to the present invention.

Reference is made to FIGURE 5 for a description of a system utilizing the benefits of a push-down memory arrangement in a data processing system having an instruction format of a different type. A storage 200 has instructions and data stored therein. The storage may be selectively addressed by signals in a memory address register 201, and information read from storage 200 is supplied to a memory buffer register 202. Information from the memory buffer register 202 may be supplied to a field register 203 whenever the information is in the form of instructions. Whenever information in the memory buffer register 202 represents operands, it may be supplied to an arithmetic unit 204. The field register 203 is divided into a plurality of fields, five being arbitrarily selected for illustrative purposes. An instruction word has the format illustrated in FIGURE 5*a*. Each field may contain an operation code of an instruction or an operand address. Field one of an initial instruction always contains an operation code. The initial instruction transferred to the field register 203 is shifted right by one field, and the content of field 1 is shifted into an operation register 205. The content of this register is supplied to a decoder and timing circuit 210, referred to hereafter as decoder 210 for convenience, which includes provision for decoding the operation code and supplying an orderly arrangement of signals to various portions of the data processing machine in order to perform a given operation. When one instruction has been completed, the field register 203 is shifted right, and the next operation code inserted in the operation register 205 is decoded in the decoder 210 to perform the next operation.

Figure 5A:
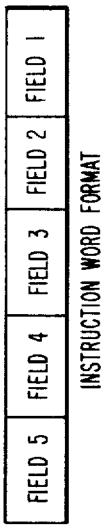
FIGURE 5*a* illustrates an instruction format used in connection with the circuit arrangement of FIGURE 5.

Although the field register 203 is illustrated as having five fields, it is pointed out that the number of fields may be varied as desired, and the number of bits within a given field may be varied, depending upon the number of operations to be specified and the size of the registers in the storage 200. Each field of the field register 203 may hold an operation code or an operand address. The objective in using an instruction format of the type illustrated in FIGURE 5*a* is to reduce the number of accesses to the storage 200 for securing instructions of a given program, thereby saving valuable computer time. Also, since the tag portion of an operation code may specify that operands are to be taken from addresses supplied by the operand counter 1 or the operand counter 2, the storage of operand addresses in the instruction word format may be reduced, thereby conserving storage space in the storage 200 which might normally be allotted to the storage of operand addresses in instructions. The instruction word format in FIGURE 5*a* has fields 1 through 5, any one of which might be an instruction or an operand address. For example, the first field of an instruction may represent an operation to be performed, and it is decoded in the decoder 210 the outputs of which are utilized throughout the computer system to perform the function defined. The second field may represent a second instruction, or it may represent the operand address to be acted upon by the decoded operation of the first field. The disposition of operations or operand addresses in the various fields of the instruction word format in FIGURE 5*a* is determined by the nature of the program of instructions to be executed.

Each field of the instruction word in FIGURE 5*a* which contains an operation code has the format illustrated in FIGURE 1*b*. That is, the operation code includes one portion which defines a function and other portion which defines a tag. The function portion specifies that the operation is an Add, Subtract, or other type of function. If an operand is involved, the tag portion specifies whether the operand address in storage is to be taken from a field in the field register 203, operand counter 1 or operand counter 2.

For programming control purposes the decoder 210 has numerous output lines which are utilized throughout the data processing system to perform a given instruction, but most of these lines have been omitted in the interest of clarity. Shown as output lines from the decoder 210 are lines 211 through 218 which are used principally to secure the next instruction or the next operand. If the next operand is to be taken from an address supplied by the field register 203, the line 211 is energized to operate the AND circuit 231 and pass the address signals from the right-most field of the field register 203 through the AND circuit 231 and the OR circuit 235 to the memory address register 201. If the next operand address is to be taken from the operand counter 1 in the push-down memory 270, the line 212 from the decoder 210 is energized to operate the AND circuit 233 and pass the content of operand counter 1 through the AND circuit 233 and the OR circuit 235 to the memory address register 201. If the next operand address is to be taken from the operand counter 2 in the push-down memory 270, the line 213 from the decoder 210 is energized to operate the AND circuit 234 and pass the content of the operand counter 2 through the AND circuit 234 and the OR circuit 235 to the memory address register 201. Whenever the content of the operand counter 1 or the content of the operand counter 2 is used to address the storage 200, the content of the selected operand counter is incremented by the value of one. If a serial type of push-down memory is employed, the incrementing may take place after the content of the selected operand counter is read from the delay line but prior to re-entry, as explained with reference to FIGURE 3. Thus the content of the selected operand counter is incremented immediately after use and made ready for its next use.

Whenever an Enter instruction is decoded in the decoder 210, the output line 214 is energized to operate the push-down memory 270, and the AND circuit 240 is energized to pass the content of the right-most field of the field register 203 to the instruction counter of the push-down memory 270. Whenever the decoder 210 decodes a Return instruction, the output line 215 is energized to operate the push-down memory 270 and cause a push-up operation to take place. As soon as the push-up operation has been completed, the line 216 from the decoder 210 is energized with a level which passes through an OR circuit 271 and operates the AND circuit 232 to transfer the new content of the instruction counter through the OR circuit 235 to the memory address register 201. Also, the level on the line 216 causes the content of the instruction counter to be incremented by the value of 1 after its content has been supplied to the memory address register.

As each instruction word is transferred from the memory buffer register 202 to the field register 203, it is temporarily stored in the field register. Then it is shifted one field to the right, and the first decoding operation takes place. If a series of operations are disposed in adjacent fields, each of the fields is successively shifted into the operation register, decoded and executed. If a given operation is followed by an operand address in the adjacent field, it is necessary to shift the field register 203 two fields to the right for the next operation code. If a given operation is followed by operand addresses disposed in two fields, adjacent thereto, it becomes necessary to shift the field register by three fields in order to position the next operation code in the operation register 205. For this purpose a field register shift counter 280 is employed to shift the field register the correct number of fields following the execution of each operation code. The output lines 217 and 218 from the decoder 210 indicate how many shifts must be made in order to bring the next operation code into the operation register 205 from the field register 203. The signals on the lines 217 and 218 represent a straight binary code, and the number of shifts represented may be selectively varied between 1 and 4. For example, if two fields are to be shifted to secure the next operation code, the field register shift counter 280 has the value two supplied thereto in binary form by signals on the lines 217 and 218. After the present instruction has been executed, the field register 203 is shifted twice to position the next operation code in the operation register 205, and the content of the field register shift counter 280 is reduced to zero. Each time the field register shift counter 280 performs a shift operation on the field register 203, the field counter 281 is incremented. The field counter 281 is reset to zero each time a new instruction world is transferred to the memory buffer register 203. In essence the field counter maintains a tally of the number of shifts made, and when five shifts have been made, the field counter 281 supplies an output signal through the OR circuit 271 to the AND circuit 232 which causes the content of the instruction counter to be transferred through the AND circuit 232 and the OR circuit 235 to the memory address register 201. The next instruction word is taken from the address in storage 200 specified by the memory address register 201, and this instruction word is transferred through the memory buffer register 202 to the field register 203 for the purpose of continuing the program.

Reference is made to Chart V for an illustration of a program which may execute a large number of instructions with relatively few accesses to storage. Chart V illustrates also how a series of instructions might be performed with operand counters 1 and 2, thereby conserving storage space which might normally be allotted for the storage of operands in instructions disposed in storage. In essence the storage space for holding a given program of instructions in memory is reduced, thereby providing additional storage space for operands.

an operation code in field one is disposed in the operation register 205. It is decoded in the decoder 210 as a Clear and Add instruction, and the tag portion specifies that the operand address is held in field 2. Field 2 is disposed in the right-most field of the field register 203, and it is transferred through the AND circuit 231 and the OR circuit 235 to the memory address register 201 because the output line 211 from the decoder 210 conditions the AND circuit 231. The address of the operand is arbitrarily designated as U in Chart V, and it is read from storage 200 and transferred through the memory buffer register 202 to the arithmetic unit 204 where the add operation takes place. The lines 217 and 218 from the decoder 210 are energized with signals which convey the value two to the field register shift counter 280. When the Clear and Add operation has been completed, the field register shift counter is operated to shift the field register two fields to the right, thereby placing field 3 in the operation register 205. The content of the field register shift counter 280 goes to zero after the two shifts are made. The field counter 281, which holds the value one after the initial shift operation, is incremented by the value of two when the field register shift counter 280 performs the two shifts, and the field counter 281 then holds the value of three. The decoder 210 decodes the next instruction as a Subtract operation, and the tag portion specifies that the operand address is to be taken from field 4 of the field register 203. Accordingly, the line 211 is energized by the decoder 210, and the content of field 4 is transferred from the right-most field of the register 203 through the AND circuit 231 and the OR circuit 235 to the memory address register 201. The address of this operand is arbitrarily designated as V in Chart V, and this operand is transferred from the storage 200 through the memory buffer register 202 to the arithmetic unit 204 where the Subtract operation takes place. The field register shift counter 280 has the value two supplied thereto by signals on the lines 217 and 218 from the decoder 210. As soon as the

CHART V

| I.C. | Field 5 | Field 4 | Field 3 | Field 2 | Field 1 | O.C. 1 | O.C. 2 |
|---|---|---|---|---|---|---|---|
| 200 | Mult. | Loc. V | Sub. | Loc. U | CLA | | |
| 201 | 500 | Enter | Loc. T | ADD | Loc. S | | |
| 500 | | 700 | Enter | ADD(toc 1) | SUB(toc 1) | 202 | |
| | | | | | | 203 | |
| | | | | | | 204 | |
| 700 | Return | SUB(toc 1) | ADD(toc 2) | SUB(toc 1) | ADD(toc 2) | 501 | 204 |
| | | | | | | 502 | 205 |
| | | | | | | 503 | 206 |
| | | | | | | 503 | 206 |
| 503 | Return | Loc. W | STO | ADD(toc 1) | ADD(toc 1) | 206 | |
| | | | | | | 207 | |
| | | | | | | 208 | |
| 208 | | | | | | | |

The program illustrated in Chart V has progressed to the instruction stored in address 200. The value 200 is disposed in the instruction counter of the push-down memory 270, and this value is transferred through the AND circuit 232 and the OR circuit 235 to the memory address register 201. The instruction word at this address is read from the storage 200 and transferred through the memory buffer register 202 to the field register 203. The field register 203 is shifted to the right by one field, and Subtract operation is terminated, the field register shift counter 280 shifts the field register 203 two fields to the right, thereby placing field 5 of the present instruction word in the operation register 205. As a result of the two shifts, the field counter 281 is incremented from the value of 3 to the value of 5, and this signifies that the field counter should secure the next instruction word. Accordingly, the field counter 281 develops an output signal to the OR circuit 271 which conditions the AND circuit 232 to transfer the content of the instruction counter through the OR circuit 235 to the memory address register 201. The value 201 is transferred from the instruction counter to the memory address register. The content of the instruction counter is incremented by the value of one to the quantity 202 after the value 201 is transferred to the memory address register. The next instruction word is taken from location 201 in storage 200 and transferred through the memory buffer register 202 to the field register 203. The instruction in the operation register 205 is decoded in the decoder 210 as a Multiply instruction, and the Multiply instruction specifies that the content of field 1 is to be used as the operand address. Thus the decoder 210 energizes the output line 211 and transfers the content of the right-most field of the field register 203 through the AND circuit 231 and the OR circuit 235 to the memory address register 201. The operand address is arbitrarily designated S in Chart V, and this operand is transferred from storage 200 through the memory buffer register 202 to the arithmetic unit 204 where the Multiply operation takes place.

It is readily apparent at this point how the system illustrated in FIGURE 5 operates to carry out a group of instructions. Since the detailed operation of the various circuits is easily seen from the foregoing description, further elaboration on such details is not given in the interest of simplicity. Instead, the subsequent discussion is directed principally to the program.

The next instruction is located in field 2, and it is an Add instruction with the associated operand located at address T as specified by field 3. The next instruction is disposed in field 4, and it is decoded as an Enter instruction which causes a branch to a subroutine. Field 5 specifies that the branch is to be made to location 500 for the next instruction word.

The instruction word at address 500 in storage 200 is transferred to the field register 203 in FIGURE 5, and field 1 is decoded as a Subtract instruction. In chart V the Subtract instruction in field 1 has the subscript (TOC 1). The subscript is a representation of Tag, Operand Counter 1. This signifies that the tag portion of the operation code selects operand counter 1, and the content of operand counter 1 is used to secure the next operand. Accordingly, the operand for the Subtract instruction is taken from an address specified by the operand counter 1 in the push-down memory 270. Thus the operand is taken from the address 202 in storage, and the operand counter 1 is incremented to the value 203 in the process. The next instruction is an Add instruction, and the associated operand is taken from storage at the address specified by the operand counter 1. Accordingly, the operand is taken from address 203 in storage, and the operand counter 1 is incremented to the value 204. The next instruction is decoded as an Enter instruction, and this causes a branch from the first subroutine to second subroutine. Accordingly, the push-down memory 270 in FIGURE 5 undergoes a push-down operation. The value 204 in the operand counter 1 is pushed down into the operand counter 2; the value 501 disposed in the instruction counter is pushed down into the operand counter 1; and the value 700 from field 4 of the instruction word is transferred to the instruction counter.

The next instruction is taken from location 700 in the storage 200 of FIGURE 5. The first instruction is an Add instruction which specifies that the operand address is to be taken from the operand counter 2. Accordingly, the value 204 disposed in the operand counter is used to address the storage 200 for the next operand, the value 204 in the operand counter 2 is incremented to the value 205. The next instruction is Subtract instruction which specifies that the next operand address is to be taken from operand counter 1. Accordingly, the next operand is taken from address 501 in the storage 200, and the value 501 in the operand counter 1 is incremented to the value 502. The next instruction is an Add instruction which specifies that the operand address is to be taken from operand counter 2. Accordingly, the next operand is taken from address 205 in the storage 200, and the value 205 in the operand counter 2 is incremented to the value 206. The next instruction in field 4 is a Subtract instruction, and the operand address is taken from the operand counter 1. Thus the next operand is taken from address 502 in the storage 200 of FIGURE 5, and the operand counter 1 is incremented from the value 502 to the value 503. The next instruction disclosed in field 5 is a Return instruction, and the push-down memory 270 in FIGURE 5 performs a push-up operation. Accordingly, the content of the operand counter 1 is transferred to the instruction counter, and the content of the operand counter 2 is transferred to the operand counter 1. The next instruction is taken from address 503 in the storage 200 of FIGURE 5 since this value is held by the instruction counter. Field 1 of this instruction is decoded as an Add instruction, and it specifies that the next operand address is to be taken from the operand counter 1. The next operand is taken therefore from address 206, and the content of the operand counter 1 is incremented to the value 207. The next instruction in field two is an Add instruction which specifies that the operand counter 1 is to be used to secure the next operand from storage 200. The next operand is accordingly taken from address 207 in the storage 200, and the content of the operand counter 1 is incremented from the value 207 to the value 208. The next instruction in field 3 is a Store instruction, and storage takes place in location W as specified by field 4. The next instruction is a Return instruction. This causes the push-down memory 270 in FIGURE 5 to perform a push-up operation. Accordingly, the value 208 in the operand counter 1 is transferred to the instruction counter, and the next instruction word is taken from location 208 of the storage 200 in FIGURE 5. The program continues on from this point.

Accordingly, it is seen how the novel system arrangement in FIGURE 5 conserves storage space by utilizing the operand counters 1 and 2 to supply operand addresses rather than use space in the storage 200 for this purpose. Thus, additional storage space for operands is provided in the storage device 200. It is further seen from the Chart V that 17 instructions are performed with only five accesses to the storage 200 in FIGURE 5. Thus there is a saving of 12 accesses to the storage 200 over the more conventional type of computing systems which require one storage access in order to secure each instruction. To the extent that the number of storage accesses is reduced, the time for performing a given program of instructions is likewise reduced, resulting in the saving of valuable computer time.

While the invention has been particularly shown and described with reference to preferred embodiments thereof, it will be understood by those skilled in the art that various changes in form and details may be made therein without departing from the spirit and scope of the invention.

What is claimed is:

1. A controller for a data processor including a storage device for storing signals representing instructions and data, control means responsive to signals representing instructions from the storage device for generating control signals which operate the computer system, a push-down memory having a plurality of registers with the last information supplied thereto being stored in a first register, said first register further including means to add the value of one to the content thereof and means for conveying the incremented content of said first register to the storage device as the storage address for obtaining the next instruction to be performed, said control means including additional means for performing various branch or jump instructions to subroutines from the main program and the storage address of each branch or jump instruction being pushed down in the push-down memory through the first register whereby a return may be made to the main program by returning to branch or jump operations in reverse order as they are pushed up to the first register.

2. The apparatus of claim 1 wherein the control means includes additional means for supplying the content of a register in the push-down memory other than the first register to the storage device for obtaining operands for use by the data processor.

3. A data processor including a program control arrangement having a storage for storing information words in the form of operand words and instruction words, said instruction words having a plurality of parts each of which is an operation code or an operand word address, a push-down memory including a plurality of registers having hardware connections such that the contents of all registers are pushed down or pushed up simultaneously when information is respectfully written in or read out of the push-down memory, the plurality of registers including a first and a second register which may be incremented selectively, means coupled to said push-down memory for using the contents of said first register to secure instruction words from storage and for incrementing the content of said first register, means coupled to said push-down memory for using the content of said second register to secure operand words from said storage and for incrementing the content of said second register.

4. The apparatus of claim 3 wherein branch instructions are stored in said storage for performing a branch or jump operation from a main program of instructions to one or more subroutines, means coupled to said push-down memory device for causing it to perform a push-down operation and store the branch address in the first register each time a branch instruction is executed.

5. The apparatus of claim 4 wherein a plurality of return instructions are stored in said storage, control means coupled to said push-down memory for causing it to perform a push-up operation each time a return instruction is executed, thereby returning through one or more subroutines back to the main program in reverse order.

6. A data processing system including a storage for storing instruction words and operand words, control means responsive to instruction words from said storage device for decoding and executing the instructions, said control means including a push-down memory for storing the departure points from the main program and subroutines and further means in said push-down memory for modifying the departure points prior to returning back through them in one or more subroutines to reach the main program of instructions.

7. The apparatus of claim 6 wherein said push-down memory includes at least first and second registers, means coupled to said first register of said push-down memory for using the content thereof to secure instruction words from storage, and means coupled to said second register of said push-down memory for using the content thereof to secure operand words from said storage.

8. A data processing system including a storage for storing instruction words and operand words, control means responsive to instruction words from said storage for decoding and executing said instructions, said control means including a push-down memory having a plurality of registers with hardware connections such that the contents of all registers are pushed down or pushed up simultaneously when information is respectively written in or read out of the push-down memory, a first register within said push-down memory having means for incrementing the content thereof, a second register within said push-down memory including means for incrementing the content thereof, said control means including further means for using the content of said first register to secure instructions from storage, and said control means including further means for using the content of said second register to secure operand words from said storage, said control means including additional means for operating the incrementing means of the first and second registers each time each is used.

9. A data processing system having a storage for storing instruction words and operand words, control means responsive to instruction words from said storage for decoding and executing said instructions, said control means including a push-down memory for storing the exit points of instruction addresses when branching from the main program or subroutines, said control means including further means for using the content of at least one register in said push-down memory for securing operands, thereby reducing the number of operand addresses which must be stored in said storage.

10. A data processing system including a storage for storing instruction words and operand words, control means responsive to instruction words from said storage for decoding and executing said instructions, said control means including a push-down memory which stores the exit points of instruction addresses when executing branch instructions, said control means including further means for using instruction addresses as operand addresses, thereby modifying the return addresses of one or more subroutines for returning to the main program of instructions.

11. A data processing system including a storage for storing instruction words and operand words, control means responsive to instruction words for decoding and executing said instructions, said control means including a push-down memory for storing the exit points when branching to one or more subroutines, each instruction word including an operation portion and a tag portion, said control device responding to the tag portion for using the addresses of exit points of a main program of instructions and subroutine as operand addresses, incrementing the same after each use, thereby changing the return address or entry points of one or more subroutines or the main program of instructions.

12. A data processing system including a storage for storing instruction words and operand words, an instruction word including at least an operation code, a memory address register connected to said storage for defining the storage address of the next word to be read from storage, a memory buffer register coupled to said storage for receiving each word read from storage, an operation register connected to said memory buffer register for receiving operation codes of instruction words transferred from said storage, a decoder and timing circuits connected to said operation register, the operation codes supplied from said storage to said operation register including a function portion and a tag portion, a push-down memory having a plurality of storage registers, at least first and second storage registers of said push-down memory including means for selectively incrementing the content of said first and second registers, means for transferring address signals from the memory buffer register to said push-down memory, means coupling the content of the first and second registers of said push-down memory to said memory address register, said decoder and timing circuit including means to transfer the content of said first register to said memory address register for the purpose of securing instructions, said decoder and timing circuits including further means for transferring the content of said second register of the push-down memory to said memory address register for securing operands, whereby successive instructions may be read from storage by successively incrementing the content of said first register in the push-down memory and successive operands may be read from storage by successively incrementing the content of said second register in the push-down memory.

13. The apparatus of claim 12 wherein said means for transferring addresses signals from said memory buffer register to said push-down memory includes a field register having a plurality of fields, means connected to one field of said field register for transferring addresses selectively to said first register to said push-down memory or said memory address register, transfer means coupled to the field register for transferring one field at a time to said operation register, said field register holding a plurality of operation codes of instructions, whereby a plurality of instructions may be supplied to said field register by one access to said storage.

14. The apparatus of claim 13 wherein said decoder and timing circuits includes means responsive to the tag portion of an operation code in the operation register for selecting the next operand address from the second register of said push-down memory or a field of said field register.

15. The apparatus of claim 12 wherein said push-down memory includes first, second and third registers each having associated means for selectively incrementing the content thereof, said decoder and timing circuits having means responsive to the content of the tag portion of an operation code in the operation register for selectively using the content of the second or third registers in said push-down memory for securing operands from said storage and for incrementing the content of said second and third registers each time each is employed to secure an operand.

References Cited

UNITED STATES PATENTS

| | | | |
|---|---|---|---|
| 3,058,658 | 10/1962 | Schmierer | 235—157 |
| 3,153,225 | 10/1964 | Mermer | 340—172.5 |
| 3,191,155 | 6/1965 | Sieber et al. | 340—172.5 |
| 3,192,362 | 6/1965 | Cheney | 235—153 |
| 3,200,379 | 8/1965 | King et al. | 340—172.5 |

PAUL J. HENON, *Primary Examiner.*

I. S. KAVRUKOV, *Assistant Examiner.*